United States Patent [19]

Albert

[11] 4,386,535

[45] Jun. 7, 1983

[54] RESONATOR RESTRAINED GYRO

[75] Inventor: William C. Albert, Boonton, N.J.

[73] Assignee: The Singer Company, Little Falls, N.J.

[21] Appl. No.: 187,010

[22] Filed: Sep. 12, 1980

[51] Int. Cl.³ ............................................... G01C 19/28
[52] U.S. Cl. ..................... 74/5.6 D; 73/504; 74/5 F; 74/5.6 A
[58] Field of Search ............ 74/5 F, 5.6 D, 5.6 A, 74/5.6 R; 73/504, 505, DIG. 4

[56] References Cited

U.S. PATENT DOCUMENTS

| | | | |
|---|---|---|---|
| 3,147,627 | 9/1964 | Hunn | 74/5.6 D |
| 3,267,746 | 8/1966 | Scotto | 74/5.6 D |
| 3,354,726 | 11/1967 | Krupick et al. | 74/5.6 D X |
| 3,413,859 | 12/1968 | Riordan | 74/5.6 D X |
| 3,438,270 | 4/1969 | Binder et al. | 74/5.6 E |
| 3,470,400 | 9/1969 | Weisbord | 73/DIG. 4 |
| 3,479,536 | 11/1969 | Norris | 73/DIG. 4 |
| 3,584,513 | 6/1971 | Gates | 74/5 F X |
| 3,608,383 | 9/1971 | Hunter et al. | 74/5.6 D |
| 3,802,276 | 4/1974 | Johnston | 74/5.6 D |
| 4,217,787 | 8/1980 | Liebing et al. | 74/5.6 D |

FOREIGN PATENT DOCUMENTS 1308205  2/1973  United Kingdom .............. 74/5.6 A Primary Examiner—Rodney H. Bonck
Attorney, Agent, or Firm—Morris Liss; Thomas W. Kennedy

[57] ABSTRACT

A gyro includes a rotatable hub with a flexing member centrally supporting a rotor. The rotor is further supported by a pair of piezoelectric force transducers angularly separated by 90 degrees. The rotor turns with the hub. Oscillators drive the transducers and, as the gyro undergoes angular displacement, the oscillators "follow" the instant natural frequency of the transducers. FM signals are generated which may be resolved into two digital signals indicative of angular rate about the gyro case X and Y axes.

4 Claims, 6 Drawing Figures

RESONATOR RESTRAINED GYRO

FIELD OF THE INVENTION

The present invention is directed to two-axis gyros and more particularly to such a gyro utilizing piezoelectric transducers for generating inherent direct digital output signals.

BRIEF DESCRIPTION OF THE PRIOR ART

Examples of prior art two-axis gyros may be found in U.S. Pat. Nos. 3,354,726 and 3,438,270, both of which are assigned to the assignee of the present application. These patents demonstrate structure for restraining the wheel of a two-axis gyro, namely by using a torquer and pickoff arrangement. The pickoff senses an angular deviation of the wheel relative to the gyro case. This pickoff signal is used to control a torquer current which causes a rebalance torque to force the wheel back to its null position relative to the case. The amount of torquer current needed becomes a measure of the gyro case input angular rate.

The disadvantages associated with the torquer and pickoff approach of the prior art include the following:

1. The torquer current and resulting power causes heat to be dissipated in the torquer windings. Limitations on the amount of allowable heat put a limitation on the amount of input rate the gyro may measure.

2. The torquer arrangement places magnetic material on the wheel. This is a source of error torques when the gyro is subjected to magnetic fields.

3. Torquer current is basically an analog measure of input angular rate. Relatively complicated electronics is needed to change this to a digital signal.

BRIEF DESCRIPTION OF THE PRESENT INVENTION

The primary purpose of the present invention is to provide a two-axis gyro which has an inherent direct digital output. This is achieved by utilizing a rotor, connected to a rotatable hub by means of two angularly spaced force transducers, preferably of the piezoelectric variety. All of these components are enclosed within a gyro case. The transducers experience a sinusoidally varying axial force due to case input angular rates about X and Y axes. Because the transducers vary their vibrational frequency in response to axial force, the output signal will be a digital signal, the frequency of which is modulated (FM) by the input angular rate. The FM signals are resolved and separated into components which are indicative of input rates about the X and Y axes. The present gyro construction and means for resolving the resultant FM output greatly simplifies the structure of a two-axis gyro and eliminates the disadvantages posed by the prior art.

By virtue of the present invention, disadvantages encountered by the prior art are obviated. Namely, the following advantages have been recognized.

1. The transducer restraint mechanism dissipates virtually no power. This is particularly attractive for high rate applications where conventional torquers dissipate high power.

2. The gyro rotor includes no magnetic materials which may cause an error when the rotor is exposed to a magnetic field.

3. The output signals are inherently digital.

4. Because the transducers rotate and also because of the disclosed signal processing, errors due to transducer bias drift effects integrate out.

5. Data processing electronics for the present gyro may be simple and does not depend on externally provided means, such as precision current or voltage sources and external clock signals, for scaled factor accuracy. Scale factor accuracy is solely dependent on the wheel angular momentum and the characteristic of the force sensitive transducers.

The above-mentioned objects and advantages of the present invention will be more clearly understood when considered in conjunction with the accompanying drawings, in which:

DETAILED DESCRIPTION OF THE INVENTION

Figure 1:
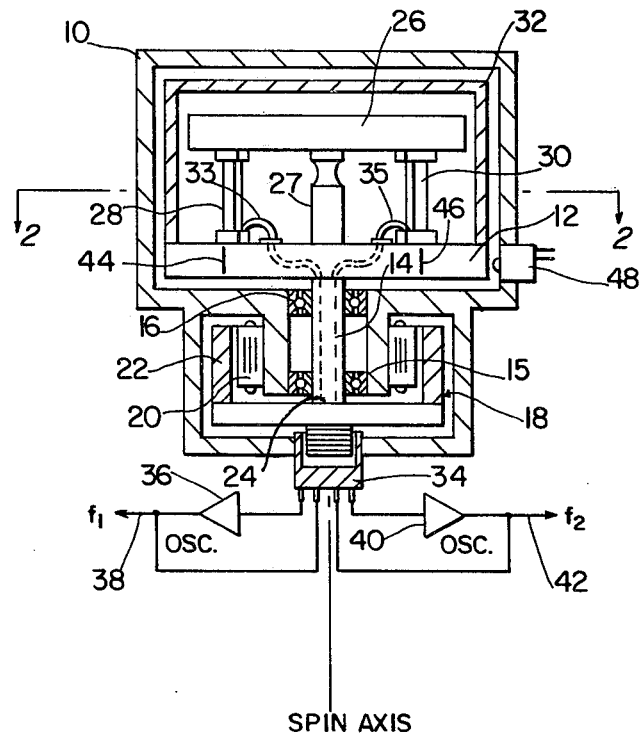
FIG. 1 is a sectional view showing the internal components of the present two-axis gyro.
Figure 2:
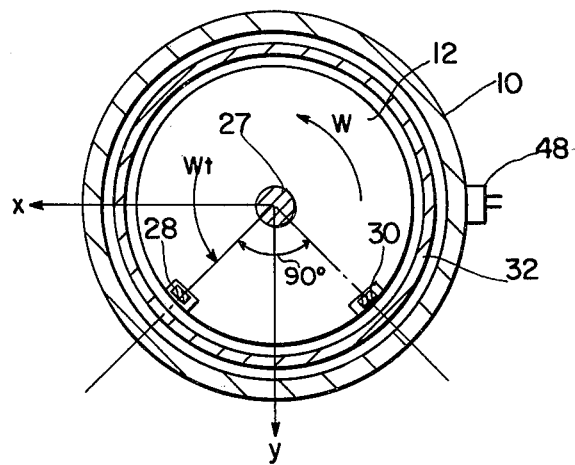
FIG. 2 is a top sectional view, taken along section line 2—2 of FIG. 1.

Referring to the figures, and more particularly FIGS. 1 and 2 thereof, the mechanical aspects of the present gyro are illustrated. A gyro case 10 encloses the inner components of the gyro including a rotatable hub 12 which is mounted to a downwardly extending shaft 14. The shaft is journalled to an internal case portion 15 through bearings 16. A conventional drive motor 18, similar to those used in existing gyros is axially disposed along the length of shaft 14. The motor includes a stator 20 and motor rotor 22. The shaft 14 is connected to the motor rotor 22 at point 24. Upon energization of motor 18, shaft 14 will rotate.

In the upper portion of case 10, a gyro rotor 26 is positioned in parallel spaced relationship to the hub 12. The centrally positioned flexing member 27 supports the rotor 26.

The rotor 26 is restrained at two points displaced 90 degrees apart, along the underside of the rotor 26 by force transducers 28 and 30 of the type disclosed in U.S. Pat. Nos. 3,470,400 and 3,479,536, assigned to the assignee of the present application. These transducers are of the crystal type, preferably of the piezoelectric type. As will be noted in the figures, the transducers are connected along the outer circumference of the hub, at an upper surface thereof. The upper end of each force transducer is likewise connected to the outer circumference of rotor 26. A cover 32 encloses the hub 12, rotor 26, transducers 28 and 30, and the flexing member 27 so that a vacuum may be maintained therein, a preferred environment for the transducers.

Wires 33 and 35 connect the outputs from the respective transducers 28 and 30 to a suitable coupling through a wire access formed in hub 12 and shaft 14. Preferably, the coupling will be of the capacitive type, although other types may be used. The coupling permits excitation of the transducers 28 and 30 from external oscillators 36 and 40. The wires 33, 35 include two leads each which are connected, via the capacitive coupling 34, to respective oscillators 36 and 40. The output 38 of oscillator 36 generates a signal having a frequency $f_1$ associated with transducer 28. Similarly, oscillator 40, associated with transducer 30 generates an oscillator output signal at 42 having an operating frequency $f_2$. FIG. 1 illustrates a symmetrical spin axis about the shaft 14, hub 12 and rotor 26. The X and Y axes mentioned hereinafter are illustrated in FIG. 2.

In order to resolve the signals $f_1$ and $f_2$, which will be frequency modulated during gyro operation, into components which are indicative of input rates about the X and Y axes, the angular orientation of the hub 12 and its interconnected rotor 26 about the spin axis must be known, relative to case 10. One means of accomplishing this determination is to mark the circumference of hub 12 with reference marks such as 44 and 46. In actual construction of the device, four such marks, located 90 degrees apart, may be found along the circumference of hub 12 thereby enabling an optical detector 48, located in case 10, to detect the quadrature changes of hub 12 as the reference marks pass by the optical detector 48. The data processing for signals from optical detector 48 are explained in greater detail in connection with FIG. 4. However, it should be noted that capacitive or other suitable type of detection may be employed in lieu of optical detection.

During operation of the gyro, the rotor and transducers all rotate about the spin axis. This forces the rotor to follow case angular rates $\Omega_x$ and $\Omega_y$. Due to gyroscopic action (T=H×Ω), the transducers 28, 30 will experience tension or compression of varying magnitude depending on their angular orientation with respect to the input rate vectors. The transducers will change frequency, increasing with tension and decreasing with compression, as described by Equations 1 and 2.

$$f_1 = f_{01} + \left(\frac{\Delta f}{\Delta \Omega}\right)_1 (\Omega_x \cos wt + \Omega_y \sin wt) \tag{1}$$

$$f_2 = f_{02} + \left(\frac{\Delta f}{\Delta \Omega}\right)_2 (-\Omega_x \sin wt + \Omega_y \cos wt) \tag{2}$$

Where $f_{01}$ and $f_{02}$ are bias frequencies that the transducers vibrate at, under no load conditions.

Figure 3A:
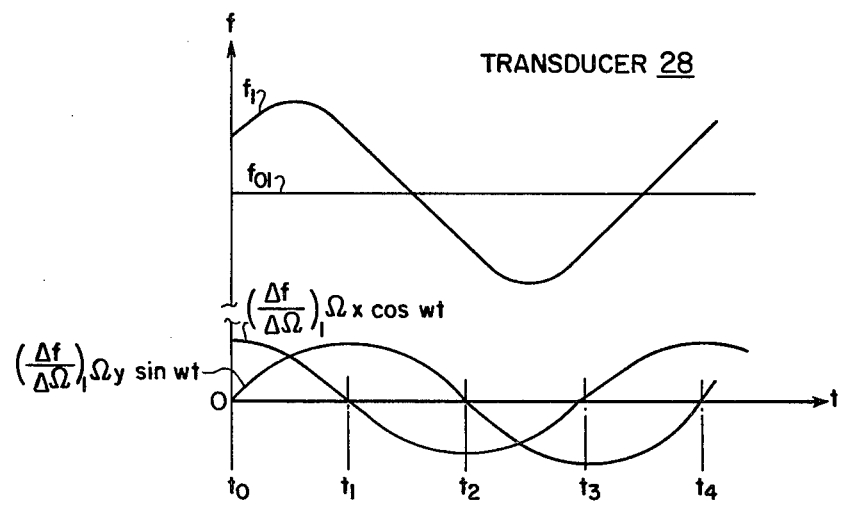
FIG. 3a is a plot of signals derived from a first force transducer.
Figure 3B:
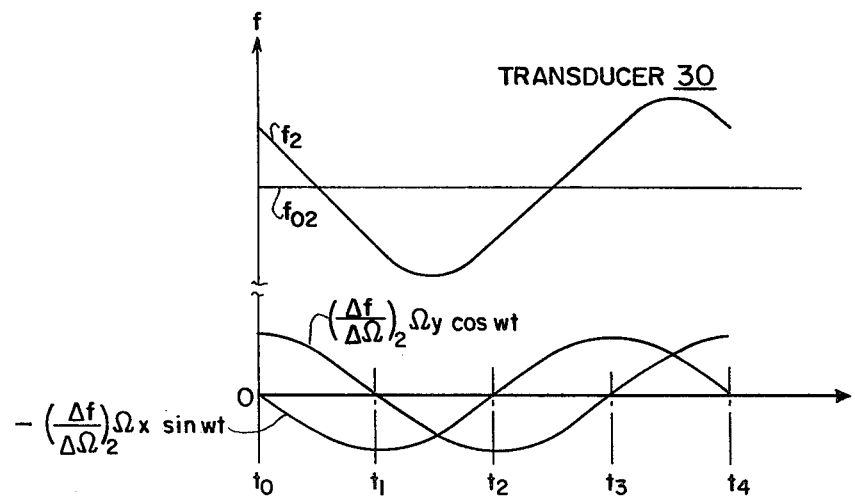
FIG. 3b is a plot of signals derived from a second force transducer.

$(\Delta f/\Delta\Omega)_1$ and $(\Delta f/\Delta\Omega)_2$ are scale factors of frequency change to input rate. FIGS. 3a and 3b illustrate plots of these equations thereby showing how gyro input rates cause a frequency modulation of the transducer outputs. It is desired to use the gyro in a strapdown system to sense angular rates and, by integrating these rates with respect to time, determine changes in angular orientation of the gyro case. This angular determination by integration is convenient in a digital system which has an output frequency which is proportional to input rate. Integration of rate is accomplished by counting cycles as indicated below.

$$\text{Indicated Rotation}\Big]_{t_1}^{t_2} = \frac{\Delta\Omega}{\Delta f} \int_{t_1}^{t_2} f\, dt \tag{3}$$

The output frequency of both transducers 28, 30 are changing due to both $\Omega_x$ and $\Omega_y$ and to separate and integrate both rate effects separately, the following must be accomplished:

1. Elimination of the bias frequency $f_o$.
2. Resolution of the effects of $\Omega_x$ and $\Omega_y$ into separate integrals.

It is desired to count (integrate) just the effects of $\Omega_x$ and $\Omega_y$. To do this the bias ($f_{01}$ and $f_{02}$) integral for each $t_N$ to $t_{N+1}$ interval must be determined and subtracted from the total $t_N$ to $t_{N+1}$ integral. Each time interval $t_0$–$t_4$ is marked by detection of a mark 46 by detector 48. The $t_0$ mark is uniquely coded to reset the count for each revolution of rotor 26.

Since the $\Omega_x$ and $\Omega_y$ effects are sin or cos functions, their integrals over a full rotor rotation will be zero (see FIGS. 3a and 3b). Therefore, the integral of $f_1$ over any full rotation to $t_N$ to $t_{N+4}$ divided by 4 will be equal to the integral of just $f_{01}$ over the interval $t_N$ to $t_{N+1}$. This reference integral (count) is called $N_{R1}$ as expressed below.

$$\int_{t_N}^{t_{N+1}} f_{01}\, dt = N_{R1} = \tfrac{1}{4} \int_{t_N}^{t_{N+4}} f_1\, dt \tag{4}$$

In operation, this reference count $N_R$ will be continuously updated. It is a difference from this reference that we are interested in. $N_R$ may be determined by integrating over any four successive intervals or any multiple of four successive intervals.

To obtain $\Omega_x$ and $\Omega_y$ integrals, the integrals obtained during each $t_N$ to $t_{N+1}$ integral are processed as follows with the net integrals called $N_x$ and $N_y$, respectively.

$$N_x = \left[\int_{t_0}^{t_1} f_1\, dt - N_{R1}\right] - \left[\int_{t_0}^{t_1} f_2\, dt - N_{R2}\right] - \tag{5}$$

$$\left[\int_{t_1}^{t_2} f_1\, dt - N_{R1}\right] - \left[\int_{t_1}^{t_2} f_2\, dt - N_{R2}\right] -$$

$$\left[\int_{t_2}^{t_3} f_1\, dt - N_{R1}\right] + \left[\int_{t_2}^{t_3} f_2\, dt - N_{R2}\right] +$$

$$\left[\int_{t_3}^{t_4} f_1\, dt - N_{R1}\right] + \left[\int_{t_3}^{t_4} f_2\, dt - N_{R2}\right]$$

$$N_y = \left[\int_{t_0}^{t_1} f_1\, dt - N_{R1}\right] + \left[\int_{t_0}^{t_1} f_2\, dt - N_{R2}\right] + \tag{6}$$

$$\left[\int_{t_1}^{t_2} f_1\, dt - N_{R1}\right] - \left[\int_{t_1}^{t_2} f_2\, dt - N_{R2}\right] -$$

$$\left[\int_{t_2}^{t_3} f_1\, dt - N_{R1}\right] - \left[\int_{t_2}^{t_3} f_2\, dt - N_{R2}\right] -$$

$$\left[\int_{t_3}^{t_4} f_1\, dt - N_{R1}\right] + \left[\int_{t_3}^{t_4} f_2\, dt - N_{R2}\right]$$

Figure 4:
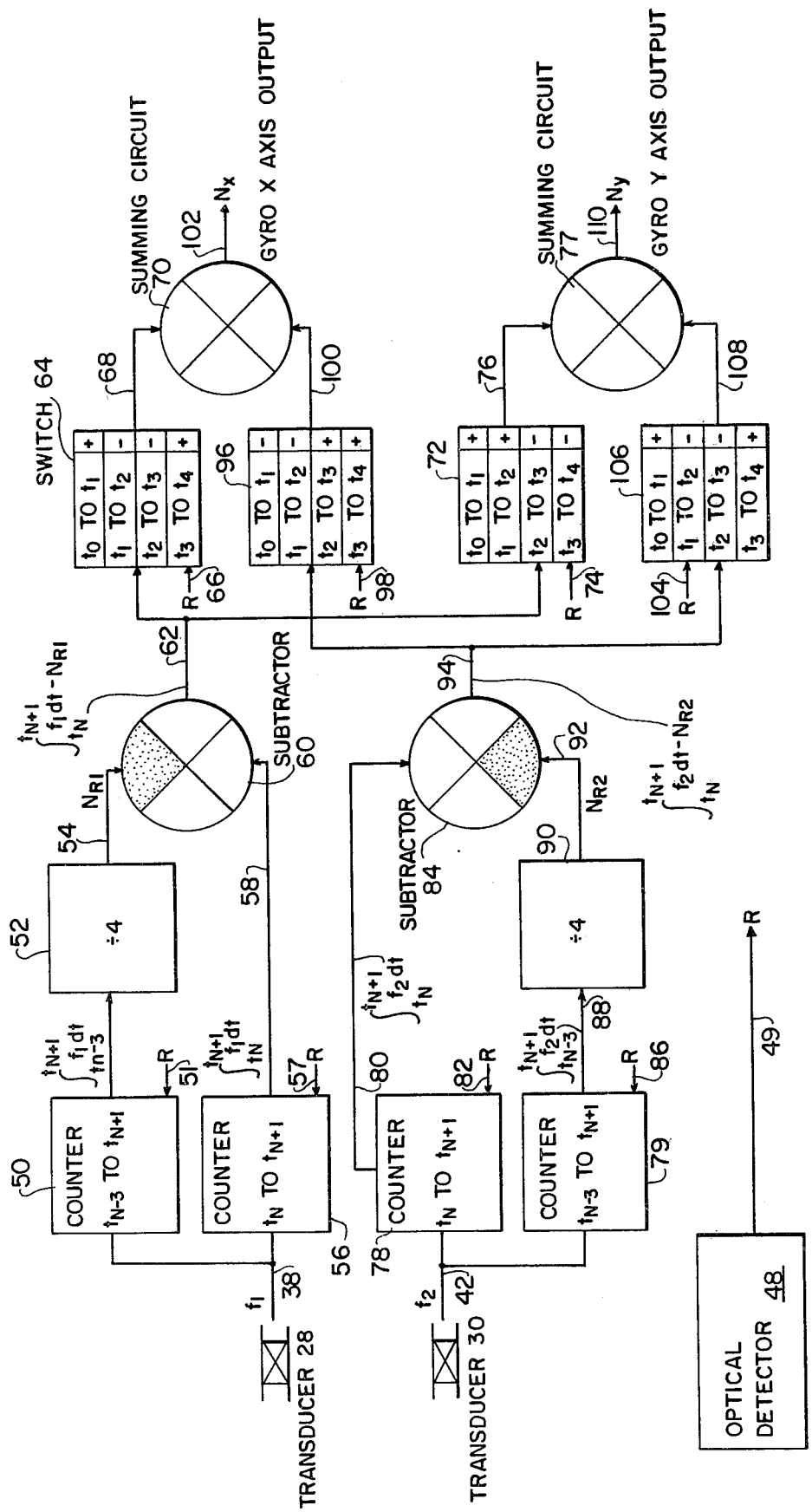
FIG. 4 is a block diagram of a data processing system for resolving signals from the gyro into components indicative of input rates about the X and Y axes.

FIG. 4 is a block diagram of the data processing system utilized to generate gyro and X and Y axis output signals. Optical detector 48 has an output lead 49 whereat output signal pulses R are generated each time a mark, such as 44 or 46 (FIG. 1) is detected. The signal R may be considered as a system clock signal, which is generated for each quadrant of rotation for hub 12 and rotor 26. The output signal from transducer 28 is connected to oscillator 36 so that the frequency modulated signal $f_1$ from oscillator 36 (FIG. 1) appears at the input of cycle counters 50 and 56. The signal R from detector 48 is also delivered to respective inputs of these counters along leads 51 and 57. The output from counter 50 counts the number of cycles from the signal $f_1$ between $t_{N-3}$ and $t_{N+1}$ to generate the integral of the $f_1$ signal during this interval. A divider 52 divides the integrated value by 4, all in accordance with the equations developed hereinbefore so that the value $N_{R1}$ presents a first input 54 to subtractor 60. Counter 56 counts the pulses of signal $f_1$ during an interval between $t_N$ and $t_{N+1}$ so that the integral of this signal is derived for the stated interval and appears along lead 58 as a second input to subtractor 60. The output lead 62 of subtractor 60 provides the value $$\int_{t_N}^{t_{N+1}} f_1 dt - N_{R1}$$

A switch 64 operates upon the output along lead 62 so that an appropriate sign for the output along lead 62 is taken into consideration. The four time intervals recognized by switch 64 are determined by the signal R, along input 66 of switch 64. As a result, the signal appearing along lead 62 acquires an appropriate sign during one quadrant of rotor rotation, this signed value appearing along lead 68 as a first input to a summing circuit 70. Similarly, a second switch 72 operates upon the output appearing at lead 62 so that the signs indicated for switch 72 accompany the output appearing along lead 62, from subtractor 60. The quadrant timing for $t_0$ to $t_4$ is again governed by the signal R, derived along a second input 74 of switch 72. The output from switch 72 appears along lead 76 as a first input to summing circuit 77. The signal from the second oscillator 40 (FIG. 1) appears as parallel inputs to counters 78 and 79. As in the case of counter 50, counter 78 has an output 80 which counts the cycles of the input signal during a quadrant time interval as determined by input R along lead 82. The output 80 of counter 78 carries the integral value $$\int_{t_N}^{t_{N+1}} f_2 dt$$

as a first input to subtractor 84. Counter 79 has an input 86 carrying input signal R. The output 88 of counter 79 generates the integral value $$\int_{t_{N-3}}^{t_{N+1}} f_2 dt$$

which undergoes division by four at divider 90. The output from divider 90 is $N_{R2}$, the latter presenting a second input 92 to the subtractor 84. The resultant signal along output lead 94 of subtractor 84 is the integral value $$\int_{t_N}^{t_{N+1}} f_2 dt - N_{R2}$$

This integral value, appearing along lead 94 is delivered in parallel, as first inputs to switches 96 and 106. Second inputs to these switches are the signal R at respective inputs 98 and 104. The switches 96 and 106 ensure a proper sign to the integral value from subtractor 84 thereby achieving the same purpose as switches 64 and 72. The outputs 76 and 108, from respective switches 72 and 106 are fed to the summing circuit 77, where the signal $N_y$, along circuit output 110, is generated. This signal is proportional to the gyro Y axis output and thus gyro angular displacement about the Y axis. In a similar fashion, outputs 68 and 100, from respective switches 64, 96 are fed to summing circuit 70 where the signal $N_x$ along circuit output 102 is generated and is proportional to the gyro X axis output and thus gyro angular displacement about the X axis. A computer (not shown) may operate upon $N_x$ and $N_y$ to generate corresponding angle data.

Accordingly, $N_x$ and $N_y$ are obtained from the $f_1$ and $f_2$ signals by a manipulation of the integrals involving these signals. The block diagram of FIG. 4 is a hardware implementation of the mathematical equations developed herein.

Figure 5:
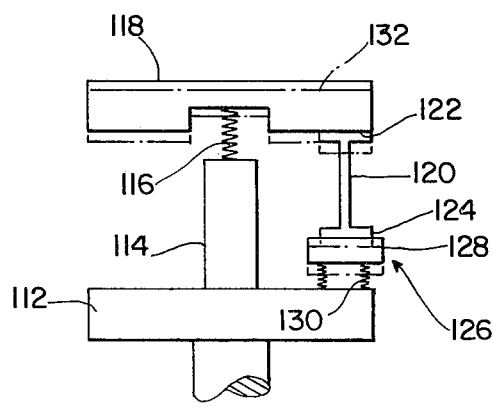
FIG. 5 is an alternate embodiment of the invention showing a modified construction of the gyro.

Referring back to FIGS. 1 and 2, the structure of the gyro described may introduce errors under certain operating conditions. The compliance of the flexing member 27 and the restraint of the transducers 28 and 30 may cause the rotor 26 to tilt with respect to the hub 12. This tilt or angular motion will cause errors in the generation of $N_x$ and $N_y$. In an effort to eliminate this tilt, FIG. 5 illustrates an alternate embodiment. The hub 112 supports a flexing member which mounts rotor 118. The flexing member is diagrammatically illustrated as a support 114 and spring connection 116 between the rotor 118 and support 114. Although only one transducer 120 is illustrated to simplify the view, it should be understood that two such transducers are employed, as explained in connection with FIGS. 1 and 2. The upper end of transducer 120 is attached to a lower surface of rotor 118, while the lower end 124 of transducer 120 is attached to a spring mass system 126 of conventional design. Such a spring mass system includes a mass member 128, to which the lower end of the transducer 120 is attached. System 126 further includes resilient members, such as springs 130 for urging rotor 118 back into planar parallel relationship with hub 112, as indicated by the dotted position 132 of rotor 118. The alternate embodiment illustrated in FIG. 5 will also deflect due to acceleration along a spin axis and by proper design the deflection can be made equal to the deflection of the flexing member (114, 116). The net result is no angular displacement and no force to the transducer 120.

Accordingly, the present invention provides a transducer restraining gyro rotor which rotates and generates FM output signals which are resolved by a data processing system into two digital signals, indicative of angular rates about the gyro case in the X and Y axes.

It should be understood that the invention is not limited to the exact details of construction shown and described herein for obvious modifications will occur to persons skilled in the art.

I claim:

1. A gyroscope comprising:
a first member rotating about a spin axis;
a second member rotating about the spin axis and positioned in spaced relation to the first member;
flexible means securing the first and second rotating members together for permitting linked rotation therebetween;
a plurality of oscillating means;
a plurality of force sensing means respectively connected in circuit with the oscillating means, the force sensing means being physically angularly spaced from each other and connected between the first and second rotating members for producing a digital signal having a vibrational frequency dependent upon axial force along the spin axis as modulated by an input angular rate; and
means connected in circuit with the oscillating means and the force sensing means for resolving the frequency modulated signal into components indicative of input rates about two orthogonal axes.

2. The subject matter set forth in claim 1 together with means for detecting angular rotation of the second rotating member between quadrature reference points.

3. The subject matter set forth in claim 1 wherein the first rotating member is a hub driven by a motor and further wherein the second rotating member is a gyroscope rotor positioned in planar spaced relation to the first rotating member and further wherein the force sensing means are transducers fabricated from crystal material.

4. The subject matter set forth in claim 1 wherein the plurality of force sensing means comprises a pair of crystal transducers disposed 90 degrees apart from each other.

* * * * *